(12) United States Patent
Jauncey et al.

(10) Patent No.: US 8,673,155 B2
(45) Date of Patent: Mar. 18, 2014

(54) OIL SPILL RECOVERY METHOD, VESSEL AND APPARATUS

(75) Inventors: Paul Jauncey, Wingrave (GB); Jose Suarez, San Diego, CA (US)

(73) Assignee: Gobbler Oil Spill Recovery Ltd., Wingrave, Aylesbury, Buckinghamshire (GB)

( * ) Notice: Subject to any disclaimer, the term of this patent is extended or adjusted under 35 U.S.C. 154(b) by 0 days.

(21) Appl. No.: 13/809,410

(22) PCT Filed: Jul. 1, 2011

(86) PCT No.: PCT/IB2011/052909
§ 371 (c)(1),
(2), (4) Date: Apr. 17, 2013

(87) PCT Pub. No.: WO2012/004712
PCT Pub. Date: Jan. 12, 2012

(65) Prior Publication Data
US 2013/0213897 A1    Aug. 22, 2013

Related U.S. Application Data

(60) Provisional application No. 61/416,368, filed on Nov. 23, 2010.

(30) Foreign Application Priority Data

Jul. 9, 2010    (GB) .................................... 1011645.7
Dec. 13, 2010    (GB) .................................... 1021012.8
Jan. 4, 2011    (GB) .................................... 1100040.3

(51) Int. Cl.
*E02B 15/04*    (2006.01)

(52) U.S. Cl.
USPC .................. 210/747.6; 210/776; 210/170.05; 210/923; 114/253

(58) Field of Classification Search
CPC ............................ E02B 15/046; E02B 15/048
USPC ................... 210/242.3, 923, 170.05, 170.11, 210/170.09, 776, 747.6; 114/343, 253
See application file for complete search history.

(56) References Cited

U.S. PATENT DOCUMENTS

| | | | |
|---|---|---|---|
| 3,735,435 A * | 5/1973 | Mikulicic et al. | 441/5 |
| 4,273,066 A | 6/1981 | Anderson | |
| 4,561,375 A | 12/1985 | Paxton | |
| 5,071,545 A | 12/1991 | Ashtary | |

FOREIGN PATENT DOCUMENTS

| | | |
|---|---|---|
| JP | 04-266588 A | 9/1992 |
| JP | 2004-352016 A | 12/2004 |
| WO | WO 01-34460 A1 | 5/2001 |

* cited by examiner

*Primary Examiner* — Terry Cecil
(74) *Attorney, Agent, or Firm* — Lewis Brisbois Bisgaard & Smith LLP; Jon E. Hokanson

(57) ABSTRACT

An oil spill recovery vessel (10) equipped with a skimmer unit (11) moves forward through an oil spill (6) at a normal skimming speed with its skimming unit operating to recover oil, and simultaneously transfers recovered oil through an oil transfer hose (17) to a bladder (19) being towed by the vessel using a towing cable (14). The oil transfer hose (17) and towing cable (14) attach to the vessel in substantially the same location situated approximately on the fore-aft centerline of the vessel and at least one third of the vessel's length from the stern or more forwardly an oil transfer bollard (15) of the vessel. In one embodiment the oil transfer hose (17) and towing cable (14) attach to an oil transfer bollard unit (15) comprising a towing post and an oil transfer pipe. The oil transfer bollard (15) can also be used to transfer oil from a towed unit to the vessel.

15 Claims, 8 Drawing Sheets

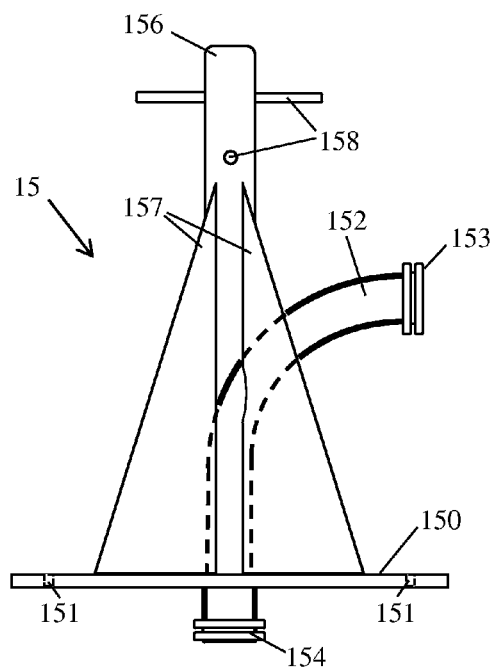
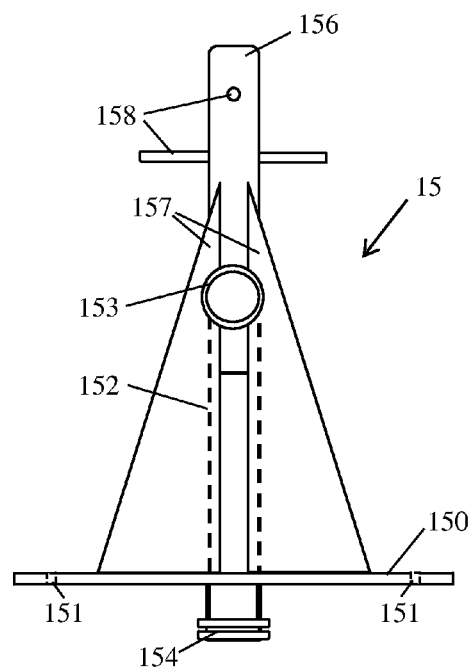
Figure 6  Figure 7
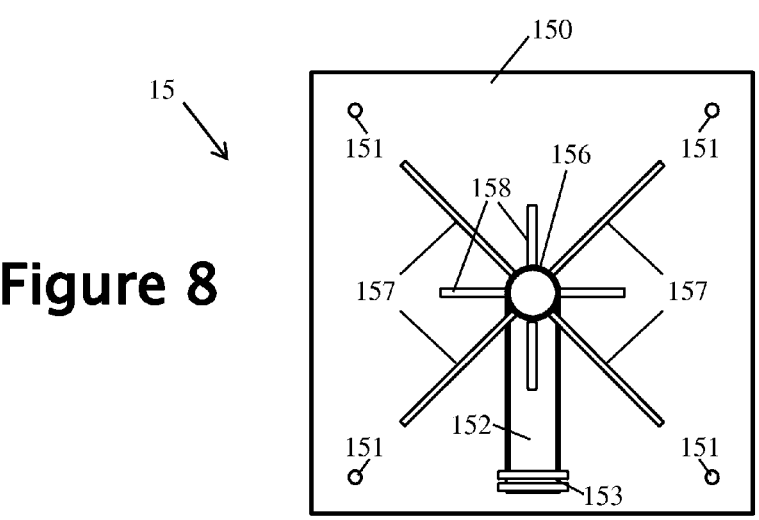
Figure 8

OIL SPILL RECOVERY METHOD, VESSEL AND APPARATUS

This application claims priority to U.S. provisional application No. 61/416,368, filed Nov. 23, 2010.

BACKGROUND

Oil spills at sea, in lakes, rivers, harbours, marinas or coastal areas are a serious environmental hazard. Wild life, marine life and coastal welfare, including commercial businesses, are at risk with each and every incident.

In responding to an oil spill, critical factors are speed of response and operational efficiency. These factors tend to favour the use of small skimmer-equipped vessels that can be rapidly transported to the area of an oil spill, can work multiple environments (lakes, rivers harbours and at least inshore), and with the use of the latest drum skimmer technology, are reasonably efficient in recovering oil. In contrast, large oil spill recovery vessels generally take longer to respond as they must make their own way by sea to the area of the oil spill, and are operationally limited to deep water. Larger vessels do, however, typically have the capability to sustain their oil recovery operations over longer periods not least because they have much larger storage tanks for recovered oil than can be installed on smaller vessels.

The limited oil storage capacity of many of the current types of small oil spill recovery vessels requires them to periodically cease operation while they transfer recovered oil either to another ship or to a land-based facility. Increasing the size of onboard oil storage tanks has the disadvantage of increasing fuel costs and limiting operational range; furthermore, the use of deck-carried oil storage bladders or tanks has an adverse effect on stability which can be a serious issue at sea. Using a floating oil storage bladder directly coupled to the oil recovery vessel, is also not a good solution as it severely restricts manoeuvrability.

SUMMARY OF THE INVENTION

According to one aspect of the present invention, there is provided an oil spill recovery vessel including an oil transfer bollard for use in transferring recovered oil between the vessel and a towed unit while the vessel is in motion; the oil transfer bollard being disposed substantially on the fore-aft centreline of the vessel and at least one third of the vessel's length from the stern or more forwardly; the oil transfer bollard comprising:
 a towing post for attaching a towing cable for the towed unit, and
 an oil transfer pipe having an outlet portion with a hose coupling by which an oil transfer hose can be coupled to the transfer pipe to transfer oil to or from the vessel.

According to another aspect of the present invention, there is provided an oil transfer bollard unit for mounting on an oil spill recovery vessel for use in transferring recovered oil between the vessel and a towed unit while the vessel is in motion, the oil transfer bollard unit comprising:
 a towing post for attaching a towing cable for the towed unit, and
 an oil transfer pipe having an outlet portion with a hose coupling by which an oil transfer hose can be coupled to the transfer pipe to transfer oil to or from the vessel.

According to a further aspect of the present invention, there is provided an oil spill recovery method in which a vessel equipped with a skimmer unit moves forward through an oil spill at a normal skimming speed with its skimming unit operating to recover oil, and simultaneously transfers recovered oil through an oil transfer hose to a bladder being towed by the vessel using a towing cable; the oil transfer hose and the towing cable attaching to the vessel in substantially the same location situated substantially on the fore-aft centreline of the vessel and at least one third of the vessel's length from the stern or more forwardly.

BRIEF DESCRIPTION OF THE DRAWINGS

Embodiments of the invention will now be described, by way of non-limiting example, with reference to the accompanying diagrammatic drawings, in which:

FIG. 6 is a side elevation of an oil transfer bollard used on the FIG. 1 oil spill recovery vessel;

FIG. 7 is an elevational view of the FIG. 6 oil transfer bollard taken in a direction looking forward relative to the installed orientation of the bollard on the FIG. 1 oil spill recovery vessel;

FIG. 8 is a plan view of the FIG. 6 oil transfer bollard;

DETAILED DESCRIPTION

Figure 1:
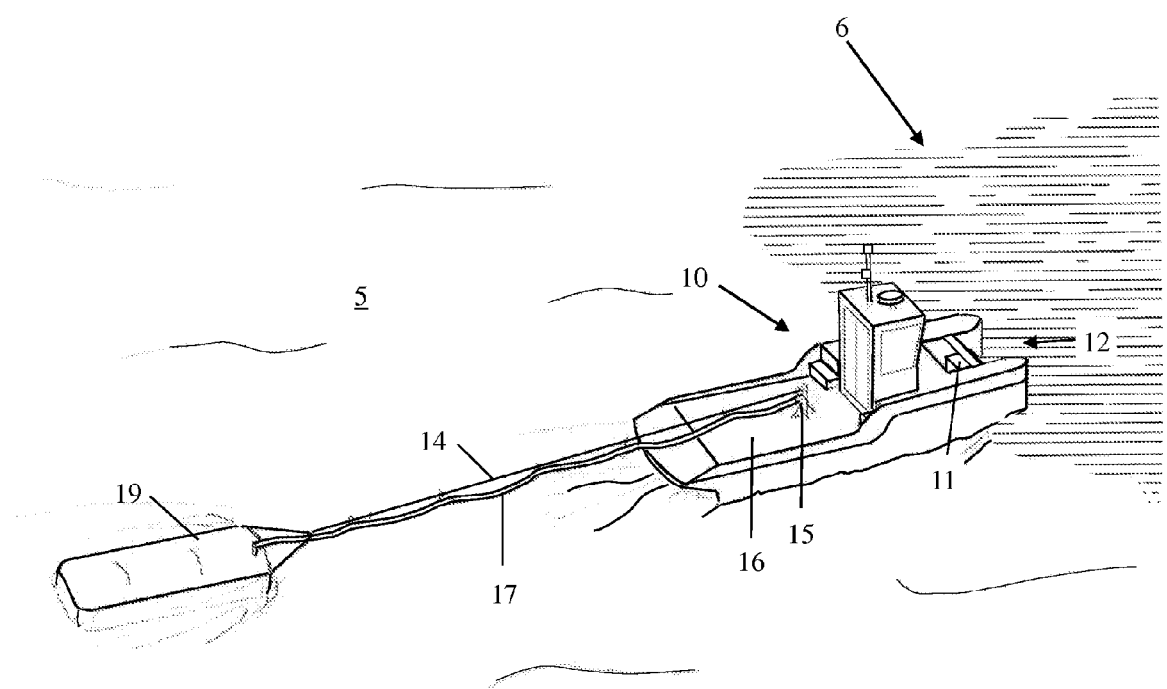
FIG. 1 is a diagram illustrating operation of an oil spill recovery vessel embodying the invention, with oil recovered by a skimmer sub-system of the vessel being transferred to a towed bladder.

FIG. 1 depicts an oil spill recovery vessel (OSRV) 10 embodying the invention in a preferred operational mode in which a skimmer unit 11, carried between twin hulls of a catamaran bow section 12 of the OSRV 10, recovers oil from an oil spill 6 on a body of water 5 as the OSRV moves through the oil spill, the recovered oil then being transferred to a towed bladder 19 without interruption of the skimming operation; in this mode of operation, the recovered oil is not stored on the OSRV 10 though it may undergo some processing aboard, for example, to separate out water which the skimmer unit may output along with the recovered oil. The bladder 19 is towed by a towing cable 14 attached to a towing post of an oil transfer bollard 15 (described in detail hereinafter) mounted on an aft towing deck 16 of the OSRV. Recovered oil is transferred to the bladder 19 through a flexible oil transfer hose 17 that is attached at one end to an oil transfer pipe forming part of the oil transfer bollard 15, and at its other end to a hose coupling integral with the bladder 19; along its length the hose 17 is suspended from the towing cable 14 by slip rings.

Figure 2:
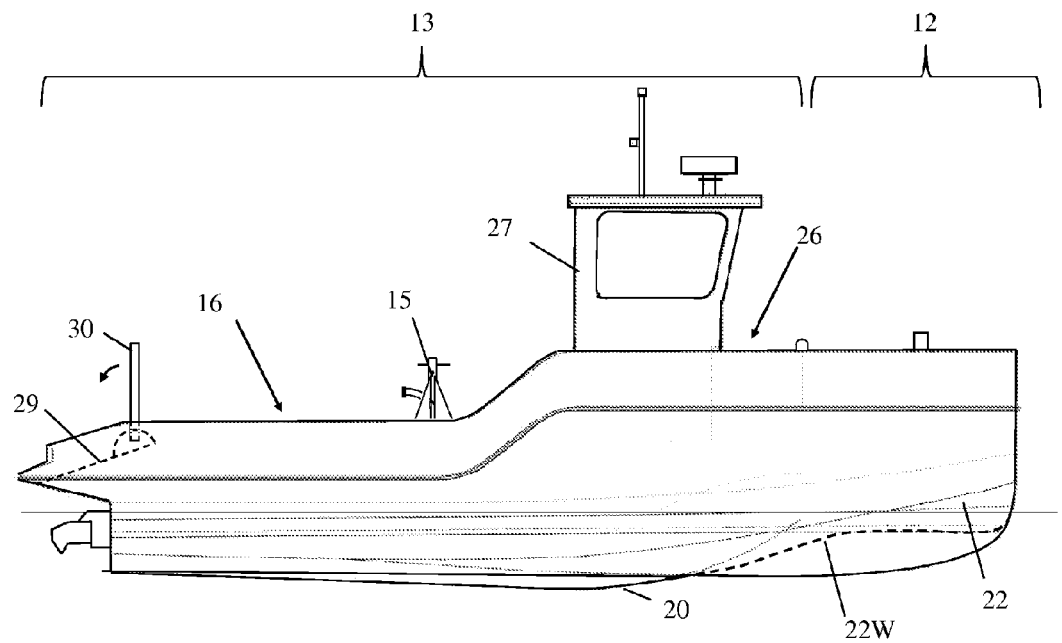
FIG. 2 is a side elevation of the FIG. 1 oil spill recovery vessel.
Figure 3:
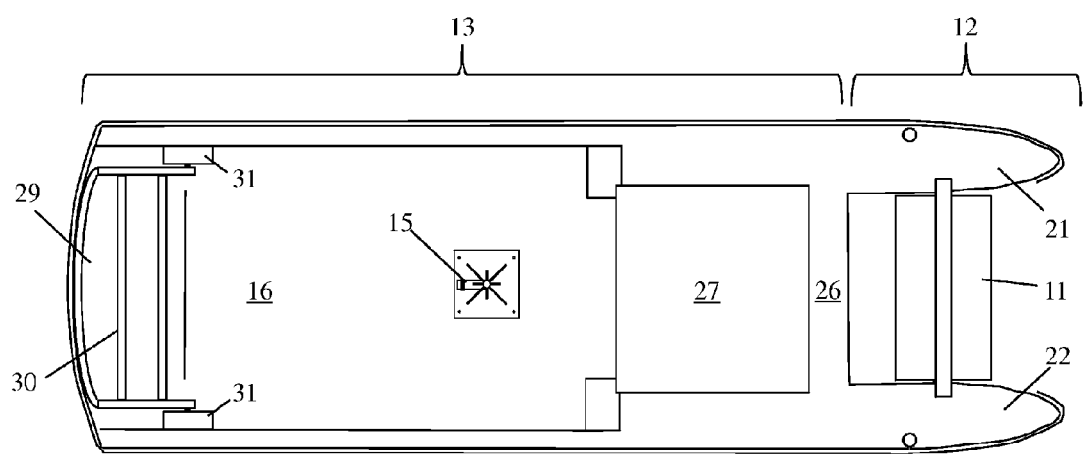
FIG. 3 is a plan view of the FIG. 1 oil spill recovery vessel.

The general form of the OSRV 10 is illustrated in FIGS. 2 and 3. Aft of the catamaran bow section 12 with the skimmer unit 11, the OSRV comprises a trimaran main section 13 in which a central hull 20 is interposed between the aft continuations of the twin hulls 21, 22 of the catamaran bow section 12. The triple hulls 20, 21, 22 of the trimaran main section 13 have conjoined upper portions with the depth of this conjoining increasing aftwards whereby to define two flow channels 24, 25 of decreasing cross-sectional area between the hulls.

When in the process of oil recovery using the skimmer unit 11, the OSRV 10 operates at slow speed (1-3 knots) and the hulls 21, 22 of the catamaran bow section 12 serve to channel the oil to be recovered to the skimmer unit 11; at the same time, the channels 24, 25 formed between the central hull 20 and the outer hulls 21 and 22 of the trimaran main section 12 help the flow through of water passing under or around the skimmer unit thereby minimizing pile up of the water in front of the skimmer unit 11.

When oil is not being recovered, the skimmer unit 11 can be raised clear of the water 5 enabling the OSRV to proceed at a fast speed (for example, 18-20 knots) and thereby minimize transit time to and from an oil spill. When the OSRV 10 is operating at its fast speed, the trimaran section of the vessel will cause it to plane partially lifting the bow section hulls 21, 22 and keeping the wetted areas to a minimum thereby reducing drag.

Regarding the general above-water arrangement of the OSRV 10, the catamaran bow section 12 and the front part of the trimaran main section 13 provide a raised fore deck 26. Most of the deck area of the main section 13 serves as the towing deck 16 on which the oil transfer bollard 15 is located; the towing deck 16 is at a lower level than the fore deck 26. A wheelhouse structure 27 is located on the front part of the trimaran main section 13 and provides the upper part of a wheelhouse; the wheelhouse extends down into the main section 13 such that the floor of the wheelhouse is substantially at the level of the towing deck 16.

The aft end of the towing deck 16 merges with a scooped transom 29 that slopes downwards towards the stern. An aft deck rail 30 is arranged to fold down from an upright position shown in FIG. 2 to a towing-operation position shown in FIG. 3 in which it lies against the scooped transom 29. The aft deck rail 30 is moved between its upright and towing-operation positions by hydraulic cylinders 31. The rail 30 is, for example, made from 38 mm alloy tube and has a height of approximately 1 m when in its upright position. The rail is slightly curved in the middle to match the curvature of the scooped transom.

The hull and wheelhouse structure are, for example, made of FRP (fibre reinforced plastic) though other materials, such as aluminum can alternatively be used. Where FRP is used, the bow and main sections 12 and 13 are treated as one and formed as two moldings, that is, a deck molding (including an uppermost portion of the hull), and a middle-and-lower hull molding; these moldings are arranged to fit closely together and a rub strake is used to cover the join.

Typical dimensions for an OSRV 10 of the above described form are:
LOA 8.85 m
Beam 2.55 m
Draft (nominal) 0.45 m
Freeboard at foredeck 1.52 m
Freeboard at towing deck 0.96 m
Height from keel to wheelhouse top 3.25 m A vessel of such dimensions appropriately fabricated from FRP and fully fitted out would typically have:
Weight when lifted (trailer weight) 3.00 Tonnes
Displacement laden 3.50 Tonnes and be Lloyds Register/American Bureau of Shipping (ABS) certifiable to 60 nautical miles from shore or from a mothership (daylight operation), that is, capable of handling 2 m waves; as used herein "offshore seaworthiness" means seaworthiness to this level of Lloyds/ABS certification.

It will be appreciated that the hull forms can be varied from those illustrated. For example the twin hulls 21, 22 of the catamaran bow section 12 can be made shallower to enable the OSRV 10 to approach right up to a beach (see dashed line 22W in FIG. 2); in this case, the bows of the twin hulls 21, 22 will lift clear of the water when planing but will sit in the water during slow speed skimming operation, guiding oil towards the skimmer unit.

Figure 4:
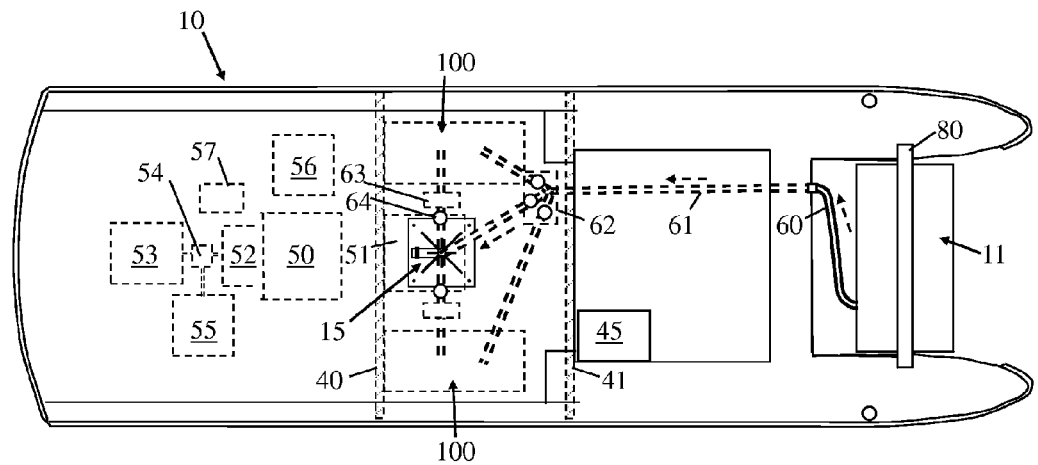
FIG. 4 is a plan view, similar to FIG. 3, showing the internal layout of the FIG. 1 oil spill recovery vessel.
Figure 5:
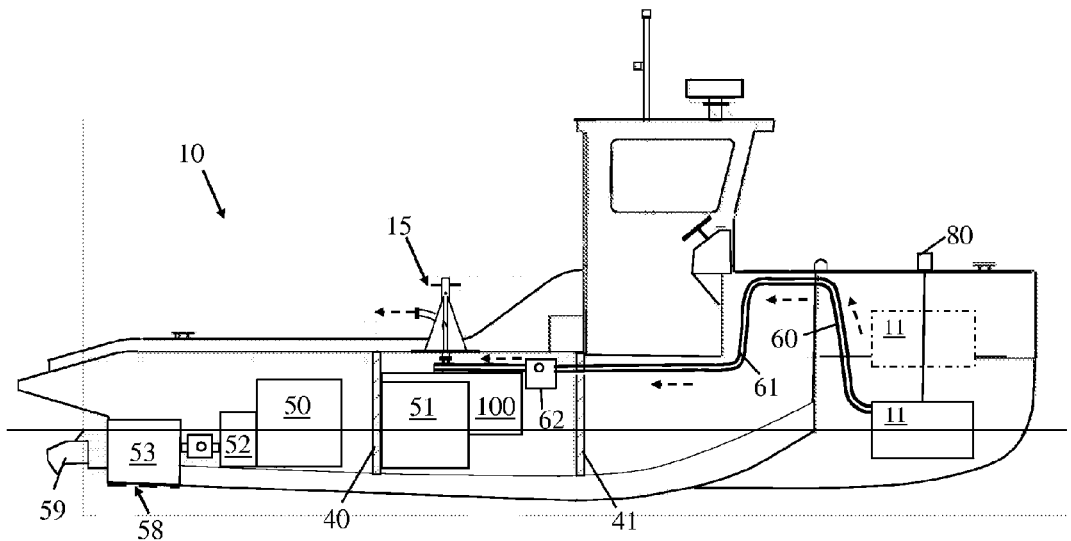
FIG. 5 is a side elevation, similar to FIG. 2, but with the nearside hull removed to show the internal layout of the FIG. 1 oil spill recovery vessel.

FIGS. 4 and 5 show the general disposition within the OSRV 10 of its propulsion system and central service equipment (hydraulic and electrical power).

A marine diesel engine 50 (for example, 250 HP (184 kw) 4200 rpm supercharged marine diesel) serves both to provide propulsive power and power for the central services. Fuel is supplied to the engine 50 from a fuel tank 51 located between fireproof bulkheads 40, 41. The compartment defined by the bulkheads 40, 41 also houses two oil/water separators 100 and tanks for hydraulic fluid.

The propulsion system comprises a water jet drive unit 53 (such as the Ultra-Jet 251 jet drive available from Ultra Dynamics Inc., Columbus, Ohio, USA) powered from the engine 50 via a transmission (such as an Aquadrive transmission from Mack Boring & Parts Co, NJ, USA) comprising a shaft with a constant velocity joint fitted to each end. One of these joints couples to the jet drive unit 53, and the other to a reversible hydraulic marine gearbox 52 (such as the PRM 750 from PRM Marine Ltd, UK). The water intake for the jet drive unit 53 is directly below it and is protected by a screen 58. The water jet outlet is a large central duct through the stern of the vessel just on the water line (this duct is referenced 235 in FIG. 16). Steering is effected by a hydraulically operated steering cylinder which moves a deflector plate 59 to direct the water jet produced by the unit 53 to port or starboard. The jet drive outlet and steering deflector are protected by the transom overhang during the launch and recovery of towed bladders. All controls for the engine 50 and water jet unit 53 are located in the wheelhouse.

The water jet from the jet drive unit 53, as well as providing propulsion, also serves to entrain the oil/water mix that bypasses the skimmer 11 and passes beneath the OSRV (principally via channels 24, 25); this entrainment helps to prevent a "pile up" of oil/water at the front of the OSRV.

As the transmission from the engine 50 to the water jet unit 53 is reversible, the flow of water through the unit 53 can be reversed to enable "back-flushing" of the jet drive intake screen 58 in the event of blockage by debris; this eliminates the need to dive under the boat to clear debris which can be hazardous in certain environments (for example, swamplands where alligators may be present or at sea in shark infested waters).

The propulsion system is selected to give a speed of the order of 18-20 knots for transit to/from an oil spill site and a slow seed of 1-3 knots for use when skimming to recover oil. Typical range is of the order of 180 nautical miles.

Regarding the central services, dual pressure hydraulic power is provided by two tandem mounted hydraulic pumps 55 driven by a transmission mounted power take off unit 54 (alternatively, this power take off may be integral with the gearbox 52). The hydraulic pump 55 supplies a central pressurised ring main (not shown, but typically stainless steel tube or similar) that distributes hydraulic pressure around the vessel; the pressurised ring main is matched by a corresponding return ring main. Drip-less quick release pressure/return connectors are strategically installed around the pressurised ring main for powering standard-supply or optional equipment. One use of this hydraulic power is to drive a hydraulically powered electric alternator unit 56 providing 110 volt ac supply as a central service; advantageously, the alternator is a synchronous spark free alternator. Another use of the power provided by the central hydraulic service is to power the skimmer unit 11 and an associated lifting arrangement. Other equipment that can conveniently be powered from the central hydraulic service includes pressure washing equipment, power capstans, fire fighting pumps and/or other ancillary equipment/controls, by simply "plugging in".

Oil Recovery System

The oil recovery system of OSRV 10 comprises the skimmer unit 11, the on-board oil handling and processing system (including the oil/water separators 100), and the oil transfer bollard 15. Before describing the oil transfer bollard in detail, a general description of the oil recovery system will first be given with reference to FIGS. 4 and 5 (certain external features of the OSRV, such as the aft deck rail 30, have been omitted from these Figures so as not to obscure internal layout details).

As already noted, the skimmer unit 11 can be raised out of the water when not needed (the position of the unit 11 when raised is shown in chain-dashed outline in FIG. 5), and subsequently lowered back into its operating position (shown in full lines in FIG. 5). Raising and lowering of the skimming unit is effected by a lift arrangement 80 powered from the central hydraulic service. The skimmer unit 11 is, for example, a floating drum oil skimmer such as the Elastec TDS118G model available from Elastec/American Marine, IL, USA; this model has a maximum collection rate of 78 US gallons per minute (16 tonnes per hour). When in its operational position, the skimmer unit is free-floating but constrained in position by a 'cat's cradle' of wires. Other types of skimmer and installation arrangement can alternatively be used.

Oil recovered by the skimmer unit 11 is pumped away from the unit through flexible hose 60 and then through fixed pipe-work 61 to a directional manifold valve 62 that permits the recovered oil, still with a small amount of water (e.g. 3%), to be selectively fed either direct to the oil transfer bollard 15 for transfer to a towed storage bladder 19 (as depicted in FIG. 1), or first to the separators 100 for removal of most of the remaining water and from there, via pumps 63 and valves 64 (only referenced in FIG. 5 in respect of one of the separators 100) to the oil transfer bollard 15. Preferably, the valves of the directional manifold valve 62 and the valves 64 operate on an interlocked basis to ensure only permitted flows are possible.

Various forms of oil/water separator are known and all generally rely on the fact that, as the specific gravity of oil is around 0.9, oil will float on water enabling it to be separated. The separators 100 may be of any form and may operate either in a continuous mode in which is drawn off continuously (that is, the suction pumps 63 are operated all the time), or in an intermittent, cyclic, mode in which oil is drawn off on an intermittent basis. More particularly regarding intermittent mode operation, each separator 100 is, for example, provided with upper and lower oil-level sensors respectively arranged to detect the oil level in the separator rising to an upper level, and falling to a lower level; oil is sucked out of the separator (by activation of the corresponding pump 63) commencing when the oil level reaches the upper level detected by the upper oil-level sensor, and subsequently terminating when the oil level falls to the lower level detected by the lower oil-level sensor.

Although it has been assumed that oil will be pumped from the separator for storage (for example in towed bladder 19—see FIG. 1), the separator 100 can itself be used for storage of limited quantities of oil.

Oil Transfer Bollard

Oil recovered by the skimmer unit 11 is pumped either directly, or via the separators 100, to the oil transfer bollard 15. As depicted in FIG. 1, the bollard 15 is fixed in position on the towing deck 16 of the OSRV 10 substantially on the fore-aft centreline of the latter and halfway between front of the centre hull 20 and the transom. The oil transfer bollard 15 provides the means to transfer recovered oil, via a transfer hose 17, to a floating 19 bladder, and simultaneously to tow the bladder 19, without impairing steerage, using a towing cable 14. With the towing cable 14 appropriately shorter in length than the transfer hose 17, the cable will take the full load of the towed bladder 19 thereby avoiding strain on the hose 17. Both hose 17 and cable 14 flex/pivot at substantially the same point, namely, the bollard 15 whereby ease of steerage is maintained as the OSRV 10 can effectively swivel around the bollard 15. Use of the oil transfer bollard 15 means that operation of the OSRV 10 is not compromised by only being able to store recovered oil to onboard storage tanks or bladders; instead, oil can be transferred off the OSRV continually while skimming (apart from occasional pauses to change bladders when the currently-towed bladder becomes full).

The construction, installation and usage of the oil transfer bollard 15 is further described below with reference to FIGS. 6 to 9 in respect of an embodiment where the bollard takes the form of a stand-alone unit that can be mounted on a vessel as and where desired (as opposed to an oil transfer bollard constructed in situ which is an alternative embodiment).

Referring to FIGS. 6 to 8, the unit-form oil transfer bollard 15 comprises a base plate 150 provided with bolt holes 151 to enable the bollard 15 to be bolted to any sturdy deck area.

A rigid, curved, oil transfer pipe 152 extends upwards through a central hole in the base plate 150 and is welded (or otherwise secured to) the base plate. The upper end portion of the pipe 152 curves round to the horizontal. The lower end of the upwardly-extending portion of the oil transfer pipe is provided with an oil inlet coupling 154 and the free end of the horizontal portion of the oil transfer pipe 152 is provided with an oil outlet coupling 153—preferably, standard universal quick release hose connections are used for the couplings 153, 154. When the bollard 150 is installed on a deck, the oil inlet coupling will be located below the deck for connection to a pipe or hose that serves to supply recovered oil to the bollard 15.

A towing post 156 is welded (or otherwise securely fixed) to the upper part of oil transfer pipe 152 coaxially with the latter whereby the oil transfer pipe effectively serves to extend the towing post down to the base plate. The towing post 156 is rigidly supported by front and rear vertical gussets 157 that serve to substantially eliminate tow loading on the oil transfer pipe 152 when the bollard 15 is being used to tow a bladder. The towing post 156 has a pair of vertically spaced orthogonal cross bars 158 to locate the towing cable.

The bollard 15 can be manufactured from a range of materials. Rather than fabricating the bollard, it can be cast using bronze, stainless steel or other suitable material. The height of the bollard 15 is chosen to provide adequate cable clearance when under load above the aft deck structure of the vessel for which the bollard is intended; a typical height from deck to the lower cross bar 158 is 0.5 m.

The unit-form bollard 15 of FIGS. 6 to 8 is installed by securing it to any sturdy, flat deck area or to a cambered deck area by use of pre-formed solid packing. As will be well understood by persons skilled in the art, it may in certain cases be desirable to reinforce the deck (for example, using backing plates) in the area where the oil transfer bollard is installed; this will depend on the nature of the deck (material and thickness), the location of underlying structure such as bulkheads, and the intended maximum towed load.

At least on small vessels, the bollard 15 is optimally mounted on the fore-aft centreline of the vessel, approximately centrally (that is, centre of gravity±10% of the vessel's length) or more forwardly. The position of the bollard can be moved more towards the stern but this progressively increases the difficulty of steering when towing a bladder; the bollard should be at least one third of the vessel's length from the stern for adequate steering performance (as will be appreciated by the skilled person, the relevant vessel length in the context of steering performance is the overall waterline length). In the present embodiment, securing the bollard to the deck of a vessel simply involves bolting the unit in position (with the axis of the horizontal outlet portion of the oil transfer pipe 152 aligned fore-aft and the oil outlet coupling 153 of facing aft) using bolts passed through the holes 151 of the base plate 150 and corresponding holes in the deck. Additional bolt holes can be drilled as required. With the bollard 15 secured in position, the oil inlet coupling 154 can be connected up to the pipe or hose that will provide the recovered oil directly or indirectly from the skimmer unit 11.

Figure 9:
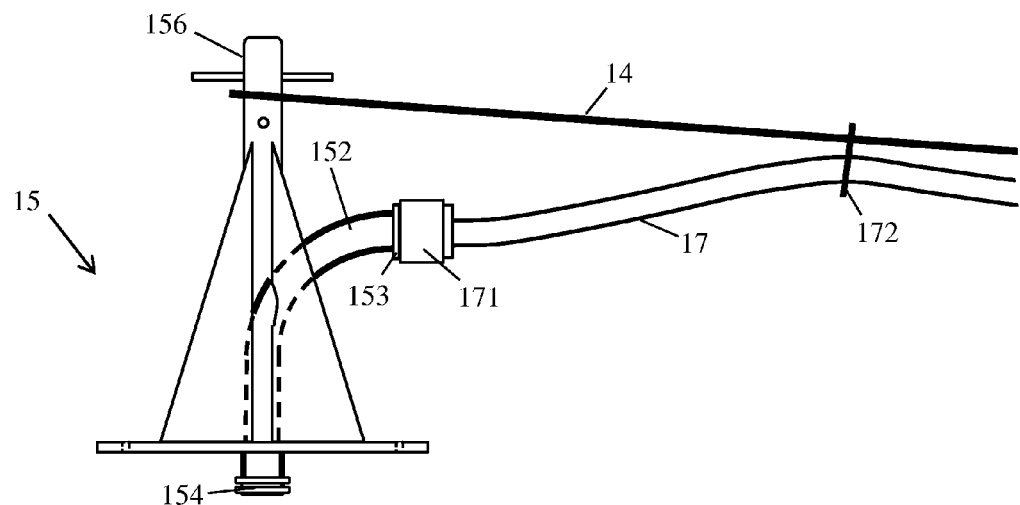
FIG. 9 is a side elevation of the FIG. 6 oil transfer bollard illustrating operational use of the bollard.

To put the oil transfer bollard 15 to use, a towing cable 14 is looped over the towing post 156 of the bollard 15 and located between cross bars 158 to prevent it sliding up or down the post (see FIG. 9). The other end of the cable 14 is connected to a bladder to be towed (the bladder itself will generally be provided with a towing harness to which the cable can easily be coupled). An oil transfer hose 17 is connected to the outlet coupling 153 of the oil transfer pipe 152 of the bollard 15 using a coupling 171 that is integral with the hose and of complementary form to the outlet coupling 153. The opposite end of the oil transfer hose 17 is directly connected to an input of the towed bladder. As already noted, the towing cable 14 must be of a lesser length than the oil transfer hose 17 to avoid strain on the hose. Preferably, the hose 17 is supported along its length (or at least over its portion above the towing deck 16) by rings, cable ties, or the like, generally referenced 172 in FIG. 9, that pass around the hose 17 and cable 14, and allow relative slippage of the hose and cable.

When the OSRV 10 is operating to recover oil (moving slowly ahead with the skimmer unit 11 in its lowered position and powered on), then assuming the oil flow control valves are appropriately set to supply recovered oil to the oil transfer bollard 15 either directly from the skimmer unit 11 or indirectly via the separators 100, oil will be pumped through the oil transfer pipe 152, into the transfer hose, and across into the towed bladder 19 for storage.

As already mentioned, ease of steerage is maintained when towing a bladder as the OSRV can still rotate around the point where the oil transfer bollard 15 is positioned. The towing cable 14 and the hose 17 move in unison, with the towing cable pivoting about the towing post 156 and the hose flexing in a zone adjacent the transfer pipe 152. The towing load is taken by the towing cable 14 alone without loading the hose 17; the towing load is transferred from the cable 14 to the towing post 156 and from there through the gussets 157 to the deck of the towing vessel without any undue load being placed on the oil transfer pipe 152.

When a towed bladder 19 is full, the oil recovery process is temporarily suspended while the bladder is capped, identified and set free for later collection. The hose and cable are easily disconnected from the towed bladder either by reversing the OSRV to the bladder or by winching the bladder to the boat using the towing cable; either way, the use of jet drive propulsion effectively eliminates any risk of the towing cable becoming entangled with the OSRV. Once a full bladder has been detached, another, empty, bladder can then be connected and the oil recovery process continued. At a convenient time, the filled bladders that have been set free can be collected— for example, connected as a "necklace" and towed to shore for pump out.

It may be noted that when the OSRV 10 is recovering oil in shallow locations, use of a towed bladder may be impractical due to surf, debris, or vegetation making steerage with a towed bladder very difficult. In this event, a conveniently-sized bladder can be securely installed on the towing deck 16 of the OSRV and directly coupled to oil outlet connection 153 of the oil transfer bollard 15. When full, this deck-carried bladder can be pumped out at a dock or into a tanker as with a skimmer vessel fitted with integral storage tanks for recovered oil.

The above-described form of oil transfer bollard provides a number of advantages several of which have already been mentioned. These advantages include simplicity of form with no moving parts, unit construction allowing ready installation on new and existing vessels; and elimination of the need to carry an on-board storage facility for oil recovered from an oil spill (the space freed up by not having to provide oil storage tanks can be utilised for the stowage of spare/empty bladders). The described arrangement for towing a bladder that is being filled provides much improved steerage as compared to having the bladder directly attached to the stern of a skimmer vessel. The used of towed bladders that are set free when full eliminates the need for constant trips to a shore-based pump-out facility and enables a suitably equipped OSRV to operate 24/7 (assuming a mother ship is on station to provide vessel re-fuelling, crew changes and a constant supply of replacement bladders).

Many variants are possible to the above described form of oil transfer bollard 15. Thus, for example, the bollard could be constructed in situ rather than being provided as a separate unit that is then bolted in place (it will be appreciated that when constructed as a unit, the bollard can be secured in position by means other than bolts, such as by being screwed to a wooden deck or welded to a steel deck). Furthermore, the measures taken to ensure that the towing post is sufficiently strong to take the towing load are not limited to the provision of gussets 157; for example other forms of bracing can be used or the towing post and the lower part of the transfer pipe can be made from materials and of a thickness as to be sufficiently strong without additional bracing. The oil transfer pipe 152 need not be rigid provided it provides a suitable coupling for connection to the transfer hose and it capable of taking a degree of tension. The inlet to the oil transfer pipe need not be connected to the vessel's pipe-work through a releasable coupling.

In the form of oil transfer bollard described with respect to FIGS. 6 to 9, the operative flexing zone of the hose 17 (the portion immediately adjacent the outlet coupling of the oil transfer pipe 152 where the majority of flexing occurs on turning of the OSRV) is close to, but offset from, the axis of the towing post 156 about which the towing cable 14 pivots.

Figure 10:
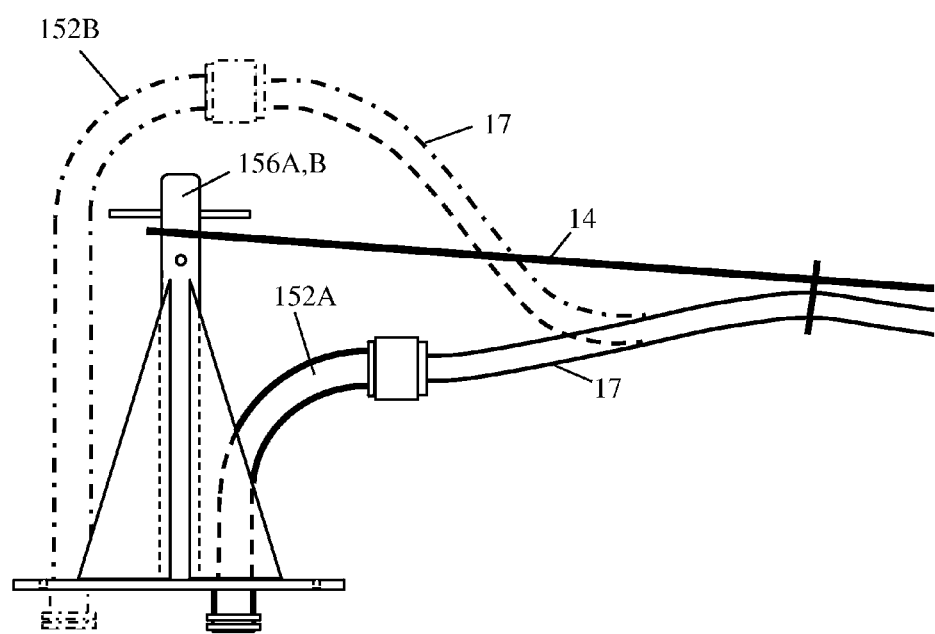
FIG. 10 is a side elevation of first and second variants of the FIG. 6 oil transfer bollard.

A limited offset of this nature is not a problem as it does not substantially interfere with the cable and hose operating in unison as the OSRV turns. Accordingly, and as illustrated in FIG. 10, it is possible to arrange for the oil transfer pipe 152 to be repositioned so that its lower portion is no longer coaxial with the towing post 156. In a first variant of the oil transfer bollard (depicted by the non chain-dashed portions of FIG. 10), the lower, vertical, portion of the oil transfer post 152A is displaced aftwards of the towing post 156B (relative to its installed orientation) and the towing post and transfer pipe are independently connected to the base plate. In a second variant of the oil transfer bollard (depicted in FIG. 10 by the towing post 156B and the chain-dashed oil transfer pipe 152B), the oil transfer pipe 152B is displaced forward of the towing post 156B (relative to its installed orientation) and, again, the towing post and transfer pipe are independently connected to the base plate.

There is no well-defined limit as to what size of offset is acceptable between the operative flexing zone of the oil transfer hose 17 and the axis of pivoting of the towing cable 14—it is simply the greater the offset, the more cumbersome the whole arrangement becomes. A practical limit of approximately 2.0 m is considered realistic for the offset (taken to the approximate middle of the operative flexing zone of the oil transfer hose 17); this leads to a maximum separation between the towing post and the outlet coupling of the oil transfer pipe of about 1.5 m depending on the flexibility of the hose when transferring oil.

It is to be noted that with the second variant of the oil transfer bollard, the operative zone of flexing of the transfer hose 17 connected to the oil transfer pipe 152B is actually closer to the axis of the towing post 156B than is the case for the form of bollard described with respect to FIGS. 6 to 9. By appropriate forward displacement of the oil transfer pipe 152B relative to the towing post 156B, it is, in fact, possible to bring the operative zone of flexing of the transfer hose 17 to lie above the towing post giving effectively zero offset between the axis of flexing of the oil transfer hose 17 and the axis of pivoting of the towing cable 14.

Figure 11:
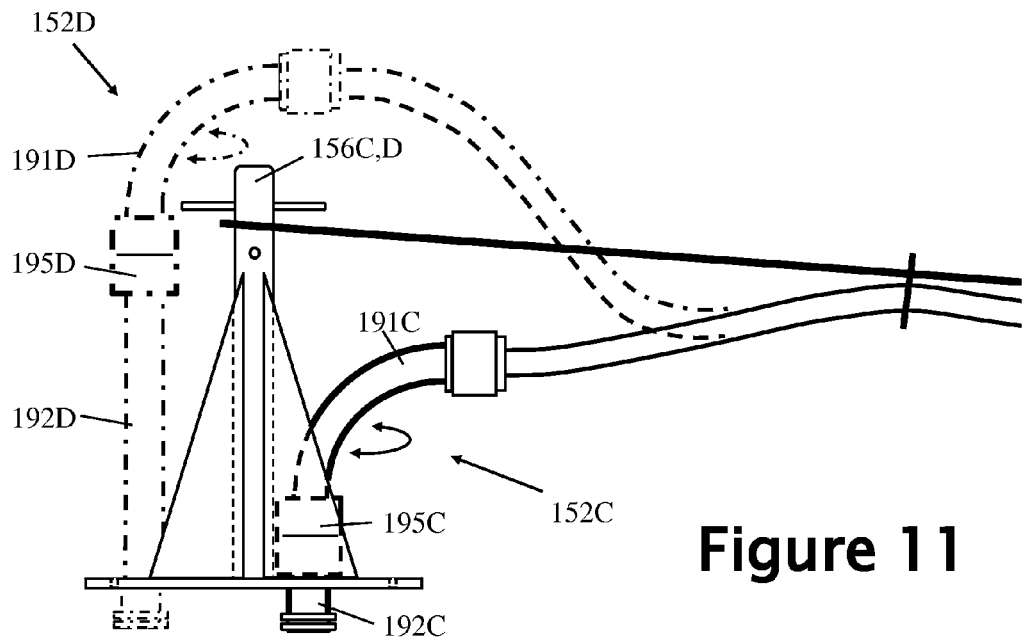
FIG. 11 is a side elevation of third and fourth variants of the FIG. 6 oil transfer bollard.

Instead of relying on hose flexibility to allow the oil transfer hose to accommodate turning of the OSRV when towing a bladder, it is alternatively possible to provide a rotatable upper portion to the oil transfer pipe of the oil transfer bollard. FIG. 11 show two such oil transfer bollard variants, these being based on the first and second variants shown in FIG. 10 but now provided with rotatable upper portions to the oil transfer pipe. More particularly, a third bollard variant, based on the first variant of FIG. 10 (oil transfer pipe 152C displaced aftwards of the towing post 156C), has an upper portion 191C of the oil transfer pipe 152C rotatable relative to the vertical lower portion 192C—this rotation is provided for by a sealed rotatable joint 195C a bottom part of which is fixed to the base plate 150 of the bollard while a top part (which is rotatable relative to the bottom part) is fixed to the upper part 191C of the oil transfer pipe 152C). FIG. 11 also shows a fourth bollard variant, based on the second variant of FIG. 18 (oil transfer pipe 152C displaced forwards of the towing post 156D); in this variant, an upper portion 191D of the oil transfer pipe 152D (shown in chain-dashed lines) is also made rotatable relative to the vertical lower portion 192D by means of a sealed rotatable joint 195D.

Figure 12:
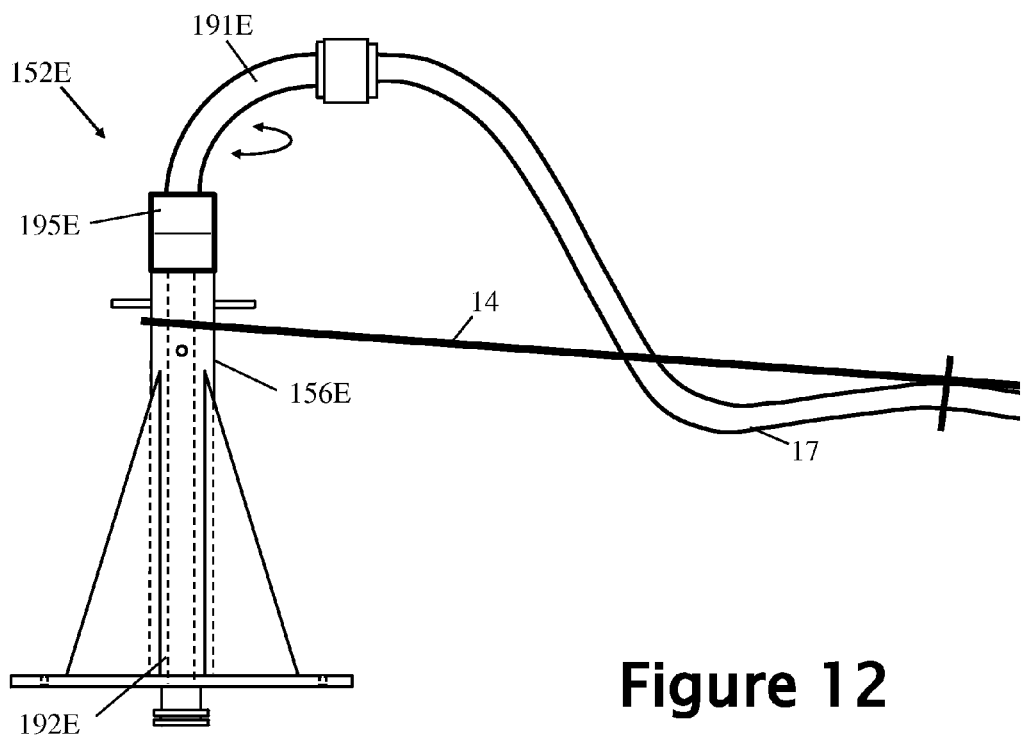
FIG. 12 is a side elevation of a fifth variant of the FIG. 6 oil transfer bollard.

FIG. 12 shows a further, fifth, bollard variant in which an upper portion 191E of the oil transfer pipe 152E is made rotatable relative to the vertical lower portion 192E of the pipe 152E by means of a sealed rotatable joint 195E. In this variant, the axis of rotation of the upper portion 191E of the oil transfer pipe 152E is the same as the axis of the towing post 156E. This is achieved by arranging for the towing post to double as the lower portion 192E of the oil transfer pipe; to this end the towing post 156E is provided with a central oil channel 200 (shown in dashed lines) and the post is dimensioned to be sufficiently strong despite this central channel. A sealed rotatable joint 195E has one part secured to the top of the towing post 156E and another part (rotatable relative to the first-mentioned part) connected to the upper portion 191E of the oil transfer pipe 152E. It will be appreciated that in use of this bollard variant, before the oil transfer hose 17 is connected to the upper portion 191E of the oil transfer pipe 152E, the towing cable 14 must first be placed in position by passing it over the upper portion 191E of the oil transfer pipe 152E and then down around the towing post 156E.

In the above-described forms of oil transfer bollard 15, a single oil transfer pipe 152 has been provided. However, it is also possible to provide multiple oil transfer pipes with respective inlet and outlet couplings. For example, two oil transfer pipes can be provided, one being a main oil transfer pipe intended for connection to receive recovered oil direct from the skimmer unit, and the other being a secondary oil transfer pipe intended for connection to receive oil sucked from the separators 100; provision of two oil transfer pipes in this manner enables the pipe-work and valve arrangement shown in FIG. 4 to be simplified since now there is no risk of recovered oil from the skimmer unit 11 being pumped into the separators 100 through their outlets as the latter no longer feed the same oil transfer pipe of the oil transfer bollard 15 as the skimmer. The arrangement also enhances operational flexibility as pumping oil from the separators (for example, to a deck-stowed bladder) can be effected while a towed bladder is still connected to the oil transfer bollard.

Figure 13:
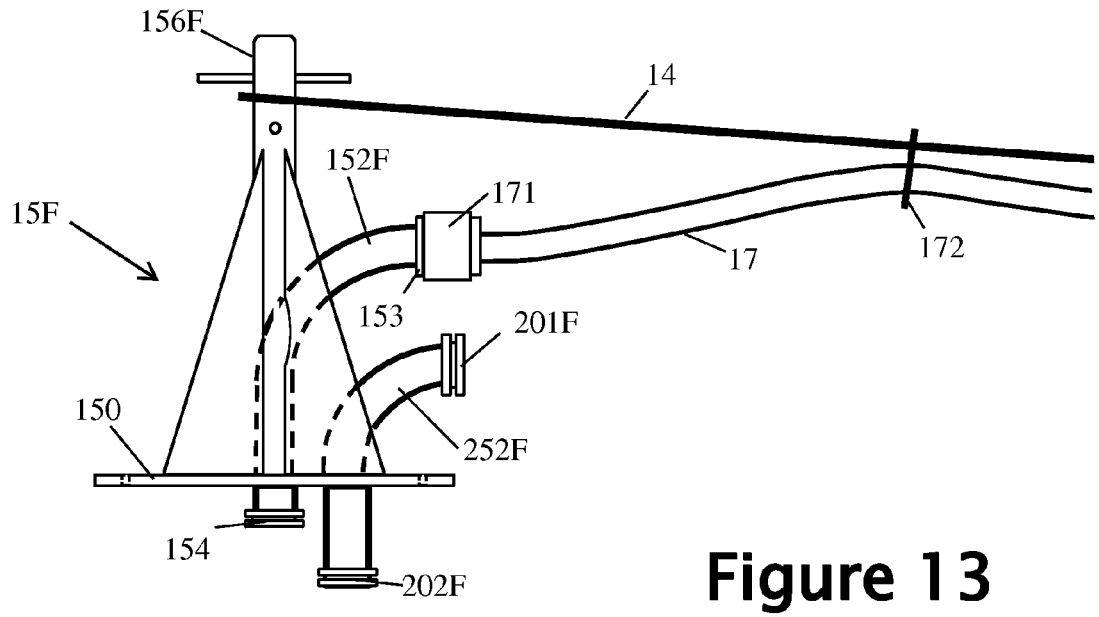
FIG. 13 is a side elevation of a sixth variant of the FIG. 6 oil transfer bollard.
Figure 14:
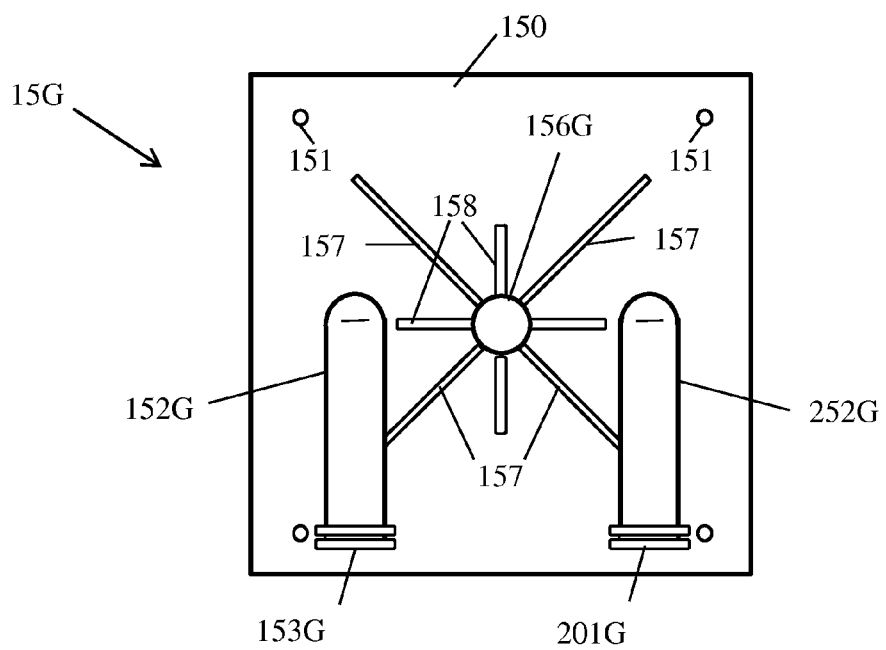
FIG. 14 is a plan view of a seventh variant of the FIG. 6 oil transfer bollard.

FIGS. 13 and 14 respectively show sixth and seventh bollard variants 15F, 15G each with a main oil transfer pipe 152 intended for connection to the output of the skimmer unit 11, and a secondary oil transfer pipe 252 for connection to the outputs of the separators 100.

More particularly, the sixth bollard variant 15F shown in FIG. 13 is similar to form of oil transfer bollard illustrated in FIGS. 6 to 9 with a towing post 156F for towing cable 14, and a main oil transfer pipe 152F curving round to the horizontal from a vertical portion coaxial with the towing post; an oil transfer hose 17 connects to an outlet coupling on the horizontal portion of the main oil transfer pipe 152F for transferring recovered oil from the skimmer unit to a towed bladder. In addition, a secondary oil transfer pipe 252F is provided which is similar in form to the main oil transfer pipe, curving round from a vertical portion provided with inlet coupling 202F to end in a horizontal portion provided with an outlet coupling 201F. The secondary oil transfer pipe 252F passes through the base plate 150 and is rigidly connected to it (for example, by welding); reinforcement may be provided as required, such as reinforcing flanges and/or a reinforcing web connecting the pipe 252F to the main oil transfer pipe 152F. With the bollard fixed in position on a vessel, the outlet coupling 201 of the secondary oil transfer pipe 252F faces aft and lies on the fore-aft axis of the vessel. In the present example, the vertical portion of the secondary oil transfer pipe 252F extends further below the base plate 150 than the corresponding portion of the main oil transfer pipe 152F; this is simply to ensure adequate room for feeder pipes to connect to the inlet couplings of the two oil transfer pipes (it will be appreciate that if the oil transfer pipes are placed further apart, the projection of two oil transfer pipes below the base plate could be made the same).

In the seventh bollard variant 15G shown in FIG. 14 in plan view, the main and secondary oil transfer pipes 152G, 252G are offset to respective sides of the towing post 156G which now extends as a solid post all the way down to the base plate 150. The main and secondary oil transfer pipes 152G, 252G are, for example, both of the same form as the oil transfer pipe 152 of the bollard shown in FIGS. 6 to 9 (except, of course, no longer incorporated with the towing post) with respective inlet couplings (not shown) below the base plate 150 and aft-facing outlet couplings 153G and 201G. Typically, when the bollard is mounted on a vessel, the towing post 156G will lie on the fore-aft axis of the vessel with the main and secondary oil transfer pipes 152G, 252G being laterally offset from this axis; provided this offset is relatively small (for example, less than 1.5 meters), no operational problems arise from the oil transfer hose 17 connecting to one or other of the offset transfer pipes.

Regarding the lateral offsetting of the oil transfer pipe relative to the bollard towing post, although in the variant forms of oil transfer bollard shown in FIGS. 10, 11 and 13, the oil transfer pipes are not laterally offset relative to the towing post, it is alternatively possible for the oil transfer pipes of these variants to be laterally offset. It will be appreciated that the term "laterally" is intended to be judged relative to the fore-aft axis of a vessel on which the bollard is to be mounted and that, in terms of the bollard taken in isolation, this axis can be taken to lie in the vertical plane containing the axis of the towing post and extending parallel to, or containing, the axis of the outlet portion of the oil transfer pipe or pipes (as the latter will generally be directed aft).

Rather than providing a single secondary oil transfer pipe 252 servicing both separators as in the sixth and seventh bollard variants shown in FIGS. 13 and 14, a respective secondary oil transfer pipe 252 can be provided for each separator 100; for example, the form of bollard shown in FIGS. 6 to 9 could be modified by providing two secondary oil transfer pipes in positions corresponding to the positions of the oil transfer pipes of the seventh bollard variant (FIG. 14).

Where the oil transfer bollard is provided with multiple oil transfer pipes as described above, the outlet of each such pipe is conveniently colour coded to identify its function (each oil transfer pipe outlet may also be provided with a colour-coded blanking cap, on small security chain, to close off the pipe when not in use).

A further possible variant (not illustrated) of the oil transfer bollard would be to combine the rotatable joint of the third to fifth variants with a hose coupling to produce a vertical oil transfer pipe topped by one half of this combined rotatable-joint/hose-coupling, and an oil transfer hose that connects at one end, via a short right-angled section of pipe, with the other half of the combined rotatable-joint/hose-coupling. Mating the two halves of the combined rotatable-joint/hose-coupling produces a rotatable joint between the oil transfer pipe and the hose, the latter extending away at right angles from the oil transfer pipe.

Additional cross bars can be provided up the bollard tow post (with adjacent cross bars orthogonal to each other) thereby to provide a range of positions height-wise for locating the towing cable; this is useful to accommodate different types of bladders and their attachment points.

It is to be understood that the described oil transfer bollard (including its variants) can be used on any type of vessel though it is particularly suited for use on small skimming vessels (regardless of the location or type of the skimmer unit); when used aboard a large vessel, the oil transfer bollard can be mounted in positions other than those described above. It is also to be understood that, like the form of oil transfer bollard described with reference to FIGS. 6 to 8, any of the described variants could be constructed in situ rather than being provided as a separate unit that is then secured in place.

Regarding the bladder towing cable, this is, for example, a 10 mm diameter stainless steel cable. It will be appreciated that when loaded the towing cable could potentially chafe a significant groove into the OSRV deck. This is avoided in the present embodiment of the OSRV 10 by the following features:

with respect to the transom 29, during towing operations the aft deck rail 30 is folded down against the transom 29 and serves as an anti chafe unit; the folded-down rail 30 also guides the cable/hose combination "up and over" the bulwarks during a turning/manoeuvring situation;

with respect to the bulwarks, these are capped with an alloy strip as protection from chafe.

Of course, proper choice of the length of towing cable used should ensure that when the cable is taut, it adequately clears the vessel. A typical suitable cable length would be such that the bladder is towed at a distance from the vessel of around 8 m and generally no less than 5 m (that is, at least approximately half the length of the OSRV 10). It should, however, be noted that no matter how large a clearance is theoretically provided for between the vessel and cable when towing, wave action on the vessel and bladder will always cause the cable to strike the vessel at times except in millpond conditions.

As already indicated, while it is intended that recovered oil will generally be transferred off the OSRV 10 to a towed bladder (or other form of towed storage), the recovered oil may alternatively be transferred from the bollard 15 to a towing-deck-carried bladder, directly coupled to the oil transfer bollard, for storage or held temporarily in the separators 100.

Bladders are available from Elastec/American Marine, IL, USA in standard sizes ranging from 1.89 cubic meters (500 US gallons) to 13.3 cubic meters (3500 US gallons), the latter being 16.5 m in length. With the above-mentioned Elastec TDS118G model skimmer unit, a bladder of 3500 US gallons capacity takes about 45 minutes to fill. Each bladder has a self sealing valve to prevent oil leakage once the transfer hose is removed. In general the smaller bladders are suitable for use as deck-carried storage bladders while the larger sizes are suited for use as towed bladders. Bladders intended to be used as towed bladders will generally be equipped with a towing bridle, be hydro-dynamic when towed, and be brightly coloured; they may also be fitted with light retaining strips along their full length and/or being provided with night lights.

Transportability

Due to its modest weight and dimensions (see the typical figures mentioned above), the described OSRV 10 is well adapted for rapid deployment by land, sea or air transportation to the general area of an oil spill before being put in the water and proceeding at speed under its own power to the oil spill itself. The modest weight and dimensions of the OSRV are occasioned in part by the absence of large onboard tanks for storing recovered oil and by the dismountable wheelhouse structure 27.

Figure 15:
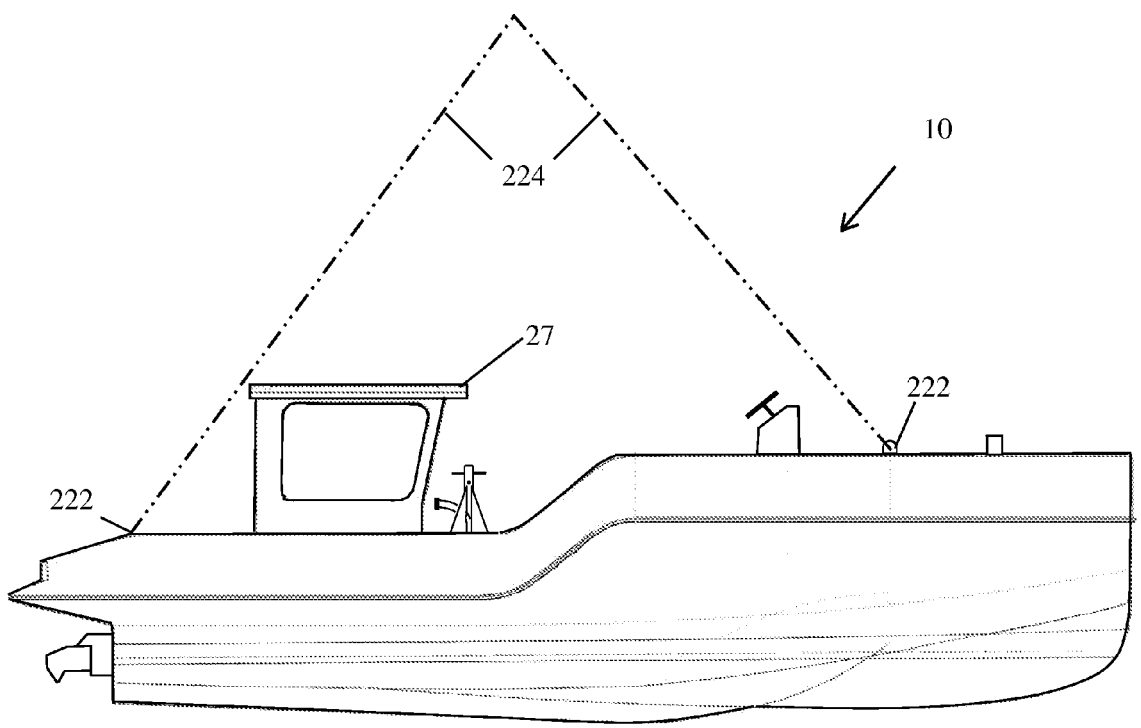
FIG. 15 is a side elevation of the FIG. 1 oil spill recovery vessel illustrating it being hoisted during loading for transportation and showing a wheelhouse structure of the vessel in a dismounted position.
Figure 16:
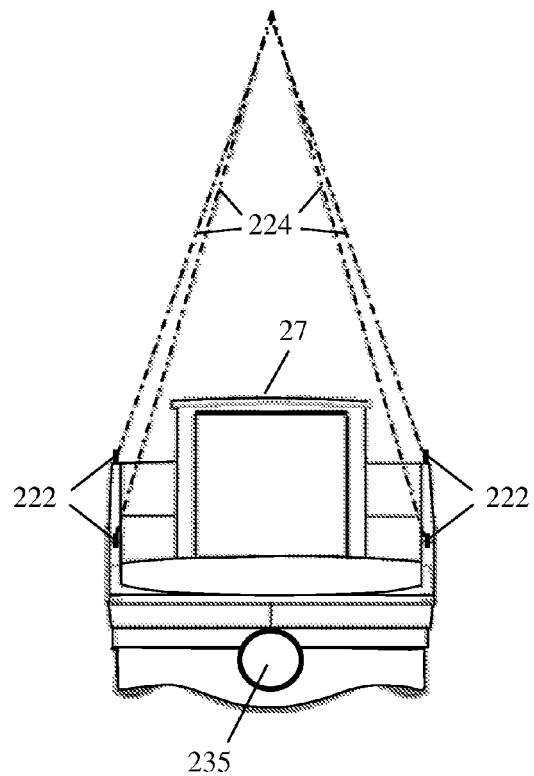
FIG. 16 is a rear elevation corresponding to FIG. 15.

Transportability can be further enhanced by providing the OSRV with in-built lifting points as illustrated in FIGS. 15 and 16 where four lifting points 222 are depicted (with lifting cables 224, shown in chain-dashed lines, already attached). In FIGS. 15 and 16 the dismountable wheelhouse structure 27 is shown dismounted and stowed on the towing deck 16 (with radar scanner removed) thereby decreasing the overall height from the keel to 2.4 m (with the radar scanner left in place the overall height is 2.92 m). The wheelhouse structure 27 is secured in place on the towing deck, for example, by bolting (or otherwise attaching) to fittings integral with the deck. The aft deck rail 30 is put in its lowered position for transportation (for reasons of clarity the aft deck rail has been omitted in FIG. 16).

Transportation of the OSRV 10 overland is effected by loading the OSRV (with its wheelhouse structure dismounted) on a trailer, for example with six or eight wheels and provided with a so-called 'fifth wheel' articulated coupling for linking with a tow vehicle such as a Dodge Ram 3500 Laramie Crew cab model. With the OSRV dimensioned according to the typical dimensions mentioned above, towing on the roads of most countries is permitted without the need for special escorts or "wide load" labels. The OSRV can be launched from its road trailer at an appropriate slipway or beach.

Regarding transportation by sea, the OSRV can readily be stowed aboard a cargo ship (on deck or in a hold or internal dock) for shipping around the world. Furthermore, as more fully described below, the OSRV can be launched and retrieved from a cargo ship (including an oil tanker) to clean up spills caused by that cargo vessel.

Regarding transportation by air, a suitable cargo aircraft would be the C5 GlobeMaster which could accommodate up to eight OSRVs 10 on trailers (with dismounted wheelhouse structures). Other suitable aircraft are the Airbus A400M and Hercules C130, though these will only take one OSRV on a trailer at a time. The OSRV 10 can also be transported slung beneath a helicopter (a rotary wing aircraft).

Operational Use

The described OSRV 10 is well adapted for across a wide range of operational environments including:

Offshore—appropriately constructed and equipped, the OSRV 10 has offshore seaworthiness (suitable for use up to 60 nautical miles from land or a mothership). Of particular note is the possibility of having sea-going commercial ships (that is, ships principally engaged in trade and not pollution control) such as oil tankers, container ships and the like, carry an OSRV 10 on board so that the OSRV can then be launched immediately the mothership causes or comes across an oil spill, even if this is in mid ocean. The OSRV 10 can be arranged to be stored and launched from davits of the mothership, or the OSRV can be stored on deck and launched using a deck crane. Regardless of whether the launch (and recovery) system used is davits or a deck crane, the OSRV 10 is advantageously provided with an extra chunky rub strake to protect the mothership in the event of the OSRV bumping against the side of the mothership during launch and recovery. Full bladders can be towed back to the mothership and either pumped out to tanks onboard the mothership (commercial ships have large integral waste oil tanks), or lifted onboard the mothership for pumping out or deck stowage. The OSRV 10 can be stationed on oil rigs and accommodation platforms (generically oil platforms) for immediate launch by davits or crane in case of spills followed by recovery of the OSRV to the oil platform. Again, recovered oil would be either pumped out from filled bladders to storage tanks on the oil platform or else a lifting rig can be used to lift the bladders aboard the platform.

Inshore—the OSRV 10 is ideally suited for this environment and its shallow draft enables it to approach and operate right up to the shoreline (particularly where the catamaran hulls have the form represented by dashed line 22W in FIG. 2).

Harbors—Although towing a bladder may not be practical in the confined waters of a harbor, as already indicated, recovered oil can be stored to a bladder stowed on the towing deck of the OSRV 10 or in the separators (for small spills).

Inland Waterways, Wetlands—The shallow draft and maneuverability of the OSRV 10 facilitate its use in these environments though generally it will be necessary to use deck-stowed bladders for storing recovered oil. The use of water jet propulsion is also an advantage as there is no propeller at risk of damage by water-borne debris and underwater obstacles. The ability to reverse the water jet unit 53 (FIG. 5) facilitates the removal of any debris that might collect against the screen 58 protecting the inlet to the water jet unit 53.

Features of the OSRV 10 that contribute to this multi-environment versatility include the dimensions of the OSRV (sufficient for seaworthiness offshore but small enough for transportation; and shallow draft for use inshore and on waterways), the lightness and ease of lifting of the OSRV (which, along with its dimensions, make it easy to transport to any environment, and allow it to be carried on ocean-going ships), the use of water jet propulsion, and the storage options for recovered oil (towed bladder, deck-stowed bladder, separators). With regard to the draft of the vessel, this should be kept to 1 m or below to enable operation in most harbours and waterways, and close to shore; preferably, the draft is 0.5 m or below. The form of the catamaran hulls represented by dashed line 22W in FIG. 2 is particularly useful for enabling the OSRV 10 to approach and operate right up to the shoreline while still serving to guide oil towards the skimmer unit. The range of options for the storage of recovered oil (towed bladder/deck storage/temporary storage in the separators) adds to the operational efficiency of the OSRV.

In the foregoing, the oil transfer bollard 15 has been described in the context of transferring oil from the OSRV 10 to towed storage. The oil transfer bollard can also be used for transferring oil from a towed unit (such as a towed skimmer unit) to an OSRV, particularly where the OSRV is provided with oil storage tanks for storing large volumes of recovered oil. The form and placement of the oil transfer bollard would be substantially as described above for the OSRV 10 and bollard 15 (including its variants). In one arrangement, an OSRV equipped with a front skimmer unit is also arranged to tow two skimmer units, one to port and the other to starboard, thereby increased the width of the swathe of water skimmed at each pass of the OSRV; in this case, the oil transfer bollard 15 is, for example, of the FIG. 14 form with the towing cables of both towed skimmer units attaching to the towing post 156G and the respective oil transfer hose from each towed skimmer unit attaching to a respective one of the two oil transfer pipes 152G, 252G. The oil recovered by the front skimmer unit and received through the oil transfer pipes 152G and 252G is fed to oil storage tanks aboard the OSRV.

The invention claimed is:

1. An oil spill recovery vessel including an oil transfer bollard for use in transferring recovered oil between the vessel and a towed unit while the vessel is in motion;

the oil transfer bollard being disposed substantially on the fore-aft centreline of the vessel and at least one third of the vessel's length from the stern or more forwardly; the oil transfer bollard comprising:

a towing post for attaching a towing cable for the towed unit, and an oil transfer pipe having an outlet portion with a hose coupling by which an oil transfer hose can be coupled to the transfer pipe to transfer oil to or from the vessel.

2. An oil spill recovery vessel according to claim 1, wherein the vessel is arranged to transfer recovered oil from the vessel to a towed storage unit.

3. An oil spill recovery vessel according to claim 2, wherein the axis of the outlet portion of the transfer pipe is substantially horizontal in the region of the hose coupling, the towing post extending above the transfer pipe and being provided with abutment means for preventing a towing cable descending down the towing post to below the level of the transfer pipe.

4. An oil spill recovery vessel according to claim 2, wherein the oil transfer pipe, including its outlet portion, is rigid with the towing post, the hose coupling of the transfer pipe being positioned offset from the axis of the towing post by a distance no greater than 1.5 m.

5. An oil spill recovery vessel according to claim 2, wherein at least the outlet portion of the oil transfer pipe is rotatable about an axis substantially parallel with that of the towing post.

6. An oil spill recovery vessel according to claim 5, wherein the axis about which the said outlet portion of the oil transfer pipe is rotatable, is offset from the axis of the towing post by a distance no greater than 1.5 m.

7. An oil spill recovery vessel according to claim 2, wherein at least the outlet portion of the oil transfer pipe is rotatable about an axis substantially coaxial with that of the towing post.

8. An oil spill recovery vessel according to claim 2, wherein the oil transfer bollard is disposed, with respect to the fore-aft centreline of the vessel, at the centre of gravity ±10% of the vessel's length or more forwardly.

9. An oil spill recovery vessel according to claim 2, wherein the oil transfer bollard further comprises a base plate to which the towing post and oil transfer pipe are rigidly connected to form a unit which is mounted on a towing deck of the vessel, the oil transfer pipe further comprising an inlet portion extending upwardly through the towing deck and the base plate and curving round to said outlet portion of the oil transfer pipe.

10. An oil spill recovery vessel according to claim 2, wherein:
the vessel further comprises a skimmer unit for recovering spilled oil, and an oil/water separator for separating out water from oil recovered by the skimmer unit;
the oil transfer bollard further comprises one or more further oil transfer pipes each having an outlet portion with a hose coupling by which an oil transfer hose can be coupled to the transfer pipe to transfer oil from the vessel; and
one said oil transfer pipe of the oil transfer bollard is arranged to receive recovered oil from the skimmer unit and another said oil transfer pipe of the oil transfer bollard is arranged to receive oil from an output of the oil/water separator.

11. An oil spill recovery vessel according to claim 2, wherein the oil transfer pipe is offset from the towing post in a lateral direction relative to the fore-aft axis of the vessel.

12. An oil spill recovery vessel according to claim 2, wherein the oil transfer bollard is disposed centrally to the vessel's length or more forwardly.

13. An oil spill recovery vessel according to claim 2, further comprising a water jet propulsion unit, a front oil skimmer unit that can be lifted clear of the water to enable rapid transit by the vessel through the water to an oil spill, and an oil transfer arrangement for transferring oil recovered by the skimmer unit, via the oil transfer bollard, to a floatable bladder that when full can be left in the water for later pick up, the vessel being both of a shallow draft and having offshore seaworthiness whereby the vessel is operable offshore, inshore, in harbours and in waterways, and the vessel being dimensioned to enable it to be transported by road trailer, by aircraft and onboard a mothership.

14. An oil spill recovery method in which a vessel equipped with a skimmer unit moves forward through an oil spill at a normal skimming speed with its skimming unit operating to recover oil, and simultaneously transfers recovered oil through an oil transfer hose to a bladder being towed by the vessel using a towing cable; the oil transfer hose and the towing cable attaching to the vessel in substantially the same location situated substantially on the fore-aft centreline of the vessel and at least one third of the vessel's length from the stern or more forwardly, the oil transfer hose connecting to a hose coupling of an oil transfer pipe of the vessel and the towing cable attaching to a towing post of the vessel.

15. A method according to claim 14, wherein the bladder is towed at a distance from the vessel of at least half the length of the vessel.

* * * * *